Patented Jan. 22, 1929.

1,699,761

UNITED STATES PATENT OFFICE.

JAMES SILBERSTEIN, OF WILKINSBURG, PENNSYLVANIA, ASSIGNOR TO WESTINGHOUSE ELECTRIC & MANUFACTURING COMPANY, A CORPORATION OF PENNSYLVANIA.

SOLDER.

No Drawing. Application filed May 21, 1927. Serial No. 193,382.

My invention relates to the art of joining metals and particularly to soldering or brazing materials.

It is among the objects of my invention to provide a solder which has a solidification point intermediate that of the low melting point solders, the lead-tin alloys, and the melting point of silver-zinc-copper alloys, the so-called silver solders.

Another object of my invention is to provide means for joining metals and to provide a joint such that the joint will possess great strength at comparatively high temperatures.

Heretofore two general classes of solders have been used. The low melting point solders were alloys which melted at about 230° C. and lower. Among these solders are the lead-tin alloys. Among the other solders, or high melting point solders which have a melting point of about 750° C. and higher, are the silver-zinc-copper alloys. The low melting point solders are workable with a soldering iron and are satisfactory with respect to strength at ordinary temperatures, but the low melting point of the alloy limits the utility of the solder to devices that do not become heated in service. The utility of the high melting point solders is limited to its use with materials that will not be injured if they are heated to the comparatively high melting point of the solder.

My invention provides means for joining articles that become heated in service to a temperature as high as 300° C. and which must be joined at comparatively low temperatures in order to preserve the desired properties of the metal.

I provide a solder that melts at a temperature higher than 300° C. and lower than 325° C. My solder consists essentially of silver and lead with an addition of a small amount of copper. The proportions of silver and lead in my solder are those approximating the lead-silver eutectic which is 2.5% silver and 97.5% lead. Copper to the amount of .25% to 5% of the combined silver and lead content is added to the alloy. The trinary alloy thus made is a solder of adequate strength and hardness. The solidification point and the melting point of the lead-silver eutectic is 304° C. and my solder has a melting range from about 301° C. to about 325° C. depending on small variations in the silver-lead ratio and in the amount of copper incorporated therewith.

I vary the proportion of silver on either side of the eutectic point from .25% on one side to 5% on the other, the remainder of the silver-lead content being 99.75% to 95% lead. Copper is added to the copper-lead alloy to the amount of .25% to 10% of the combined silver and lead. The minor impurities usually present in commercial lead, silver and copper may be present. Although the above-named variations may be made in my solder, I prefer to prepare the solder so that the composition will be silver 2.5%, copper .25% and the remainder lead and minor impurities.

The solidification point of the preferred composition is about 301° C. At temperatures below the solidification point of the alloy, the strength of the solder is sufficiently constant to provide the desired properties of a solder. The point of liquefaction of the solder is low enough so that it may be applied with a soldering iron and may be used for making joints in such materials as copper and others that are insulated with materials which deteriorate rapidly at the higher temperatures necessary for soldering with the high melting-point solders when the insulation is comparatively near the joint. However, if desired, the copper parts may be joined by the process of "sweating", in which the solder in the form of powder or ribbon is placed between the parts to be joined and then the parts are heated electrically or with a flame to the melting temperature of the solder. Such a joint may be executed with my solder without injuriously affecting the insulation and other materials in or near the joint.

My solder is particularly useful for making soldered copper joints, although it may be utilized successfully with other metals. Copper parts to be joined, such as copper wires, are cleaned in order to remove foreign matter and oxides and they are then heated in the usual manner. The soldered joint consists of an adherent unitary structure comprising copper on either or both sides of a thin adherent film of the solder.

While I have described a specific embodiment of my invention, I do not wish to be limited thereto, as modifications of my invention will suggest themselves to those skilled in the art without departing from the spirit of my invention as defined in the annexed claims.

I claim as my invention:

1. A solder comprising an alloy of silver and lead in the proportion of .25% to 5% silver and the remainder lead and minor impurities and copper in the proportion of from .25% to 10% of the combined lead and silver content.

2. A solder comprising an alloy of silver and lead in the proportions of .5% to 4% silver and the remainder lead and minor impurities and copper in the proportion of from .25% to 1.5% of the combined lead and silver content.

3. A solder comprising an alloy of silver and lead in the proportions of .5% to 3% silver and the remainder lead and minor impurities and copper in the proportion of from .25% to 1.5% of the combined lead and silver content.

4. A solder comprising an alloy of silver and lead in the proportions of about 2.5% silver and the remainder lead and minor impurities and copper in the proportion of from .25% to 1.5% of the combined lead and silver content.

5. A solder comprising an alloy of silver and lead in the proportions of about 2.5% silver and the remainder lead and minor impurities and copper in the proportion of from .25% to 1% of the combined lead and silver content.

6. A solder comprising an alloy of silver and lead in the proportions of about 2.5% silver and the remainder lead and minor impurities and copper in the proportion of about .25% of the combined lead and silver content.

7. A composite metal joint comprising portions of copper and an adherent metallic film between said portions consisting of an alloy of lead and silver in the proportions of .5% to 6% silver and the remainder lead and copper in the proportion of from .25% to 1.5% of the combined lead and silver content.

8. A composite metal joint comprising portions of copper and an adherent metallic film between said portions consisting of an alloy of silver and lead in the proportions of about 2.5% silver and the remainder lead and minor impurities, and copper in the proportion of about .25% of the combined lead and silver content.

In testimony whereof, I have hereunto subscribed my name this 14th day of May, 1927.

JAMES SILBERSTEIN.